(12) United States Patent
Go

(10) Patent No.: US 12,462,701 B2
(45) Date of Patent: Nov. 4, 2025

(54) DYNAMIC THREE DIMENSIONAL TEACHING AID

(71) Applicant: Jong Taek Go, Goyang-si (KR)

(72) Inventor: Jong Taek Go, Goyang-si (KR)

( * ) Notice: Subject to any disclaimer, the term of this patent is extended or adjusted under 35 U.S.C. 154(b) by 905 days.

(21) Appl. No.: 17/695,590

(22) Filed: Mar. 15, 2022

(65) Prior Publication Data

US 2023/0005379 A1   Jan. 5, 2023

(51) Int. Cl.
| | |
|---|---|
| G09B 1/08 | (2006.01) |
| G09B 19/08 | (2006.01) |
| A63F 7/06 | (2006.01) |
| A63F 9/14 | (2006.01) |
| A63F 9/34 | (2006.01) |
| A63H 33/26 | (2006.01) |

(52) U.S. Cl.
CPC .............. *G09B 1/08* (2013.01); *G09B 19/08* (2013.01); *A63F 7/068* (2013.01); *A63F 9/14* (2013.01); *A63F 9/34* (2013.01); *A63H 33/26* (2013.01)

(58) Field of Classification Search
None
See application file for complete search history.

(56) References Cited

U.S. PATENT DOCUMENTS

| | | | | |
|---|---|---|---|---|
| 2,525,738 A | * | 10/1950 | Tormey .................. | A63F 9/14 273/153 R |
| 3,961,791 A | * | 6/1976 | Etchegoyhen ........... | A63F 9/14 446/136 |
| 4,834,371 A | * | 5/1989 | Hay ........................ | A63F 7/068 273/443 |
| 6,561,511 B1 | * | 5/2003 | Vaysberg ................ | A63F 7/068 273/443 |

FOREIGN PATENT DOCUMENTS

| | | |
|---|---|---|
| KR | 10-2003-0062804 | 7/2003 |
| KR | 10-2004-0019808 | 3/2004 |
| KR | 10-2172853 | 11/2020 |

OTHER PUBLICATIONS

English Specification of 10-2003-0062804.
English Specification of 10-2172853.
English Specification of 10-2004-0019808.

* cited by examiner

*Primary Examiner* — James B Hull
(74) *Attorney, Agent, or Firm* — ANTONIO HA & U.S. PATENT, LLC

(57) ABSTRACT

The present invention relates to a dynamic three-dimensional teaching aid that allows for alphabet teaching or storytelling for infants or children in diversified manners by dynamic movement of a teaching member with teaching content when the teaching member is moved, thereby stimulating indefinite curiosity and imagination of infants and children, meeting their learning ability, arousing interest not to be bored and to appear novel despite repeated use, and letting them actively participate in and focus on learning and that has a simplified structure, is easy to manipulate, and is accurately controllable for its movement. More specifically, the dynamic three-dimensional teaching aid is configured so that a first magnet 23 is moved under a teaching board 1 by a control rod 2, and a moving block 3 coupled with a teaching member 4 is placed, which includes an attractive force element to be attracted by the first magnet 23 and a second magnet 32, on a side of the attractive force element, to exert a repulsive force to the first magnet 23 to be rotated depending on changes in the moving direction.

13 Claims, 13 Drawing Sheets

(a)

(b)

(a)

(b)

(a)            (b)

DYNAMIC THREE DIMENSIONAL TEACHING AID

CROSS-REFERENCE TO RELATED APPLICATION

This application claims priority to Korean Patent Application No. 10-2021-0022605 filed in the Korean Intellectual Property Office on Feb. 19, 2021, the disclosure of which is incorporated by reference herein in its entirety.

TECHNICAL FIELD

The present invention relates to a dynamic three-dimensional teaching aid that allows for alphabet teaching or storytelling for infants or children in diversified manners by dynamic movement of a teaching member with teaching content when the teaching member is moved and that has a simplified structure, is easy to manipulate, and is controllable for its movement.

DISCUSSION OF RELATED ART

In general, teaching aids, such as picture books, children's books, cards, stickers, and puzzles may be used for basic alphabet teaching for infants or children. Teaching aids for storytelling to enhance language comprehension, as well as alphabet teaching, are also used.

However, these teaching aids do not arouse vigorous curiosity and interest of infants and children and cause them to easily get bored and distracted, failing to present efficient teaching effects.

In particular, learning methods using teaching tools that do not give fun, interest, curiosity, and novelty, force infants and children to participate in learning passively and by rote, rather than actively and voluntarily, thus failing to meet their unlimited desire for learning.

Therefore, the most important thing when teaching infants and children is to let them more actively attend learning and maximize the ability to understand and learn the content being learned by using exciting and fun play aids that are able to stimulate the curiosity and interest of infants and children and let their imagination run wild.

To that end, Korean Patent Application Publication No. 10-2020-0065242 discloses a 3D fairy tale play teaching tool configured so that in the background of a children's book, character dolls on a stage are moved by an operation mechanism disposed under the stage. The character doll has a metal material attached thereon, and the operation mechanism has a magnet. The character doll is moved in the direction in which the magnet is moved by the operation mechanism. However, since the character doll cannot be rotated, the teaching effect using the character doll is limited. In other words, since it is necessary to teach by associating the alphabet letters with the related designs (or images, photos, characters, models, etc.), it is preferable to move the character dolls and expose the characters and designs alternately. To do that, the character dolls must be rotated while moving. However, the conventional teaching tool can't do so.

Korean Patent Application Publication. No. 10-2004-0019808 discloses an educational material in which a disc capable of attaching a charged body printed with, e.g., letters, numbers, fractions, polygons, circles, lines, or dotted lines, is formed to have, in a lower portion, a magnet built-in hemisphere and is placed on a non-magnetic plate, and is moved to rotate the disc, under the non-magnetic plate using a writing instrument 1 having a magnet embedded not to be parallel with the non-magnetic plate. Here, a point deviating from the center point of the hemisphere forms a contact point, and a frictional force acts upon movement, and the direction of rotation is determined according to the direction of movement. Accordingly, since the disk rotates when moving, various types of learning is possible by changing the print content of the charged body attached to the disc. However, the rotation speed is changed by the magnetic force or contact resistance of the magnet, and it rotates randomly, so it is difficult to control the rotation speed and the rotation angle. Thus, its use is limited to learning for the purpose of showing different printed designs by rotation. In other words, the instructor cannot teach by illustrating letters and related designs alternately.

As another type of rotatable teaching tool, the play tool disclosed in Korean Patent Application Publication No. 10-2003-0062804 has a magnet at the bottom of the operation unit placed on the play board. The magnet placed under the play board is rotated to rotate the operation unit, while adjusting the rotation angle or in place. Further, the magnet under the play board and the magnet of the operation unit have different poles face each other, so that the rotation angle may be adjusted more precisely. However, the structure for rotating the magnet is complicated and bulky, and it is impossible for the instructor alone to simultaneously operate the plurality of operation units, and additional manipulation for rotation is needed, and use is inconvenient. Thus, it is appropriate as a play tool, rather than for teaching, and is limited in use for alphabet teaching.

SUMMARY

Therefore, the present invention aims to provide a dynamic three-dimensional teaching aid with a simplified structure, which may represent teaching content in diversified manners by changing the position of a dynamic teaching tool or continuously express teaching contents related to each other using 3D dynamic teaching tools by rotating the dynamic teaching tool by a predetermined angle while moving and may thus enable storytelling play using dynamic movements or teaching of associating alphabet letters with related images, thereby stimulating indefinite curiosity and imagination of infants and children, meeting their learning ability, arousing interest not to be bored and to appear novel despite use many times, and letting them actively participate in and focus on learning.

To achieve the foregoing objectives, according to the present invention, a dynamic three-dimensional teaching aid comprises a teaching board 1; a control rod 2 for moving at least one first magnet 23 along a lower surface of the teaching board 1, the at least one first magnet 23 including an upward magnetic pole surface 231 and a downward magnetic pole surface having different polarities; a moving block 3 placed on the teaching board 1 and including an attractive force element to apply an attractive force to the upward magnetic pole surface 231 of the first magnet 23 and a second magnet 32 to apply a repulsive force to the upward magnetic pole surface 231 to be able to rotate so that a repulsive force acts in a direction opposite to the moving direction of the first magnet 23; and a teaching member 4 coupled to the moving block 3.

According to an embodiment of the present invention, the attractive force element may be implemented as a metal piece 33 attached to a magnet.

According to an embodiment of the present invention, the metal piece 33 may be attached to a heteropolar magnetic pole surface 321 of the second magnet 32, which has a different polarity from the upward magnetic pole surface 231 of the first magnet 23.

According to an embodiment of the present invention, the attractive force element may be implemented by a heteropolar magnetic pole surface 321 of the second magnet 32, which has a different polarity from the upward magnetic pole surface 231 of the first magnet 23.

According to an embodiment of the present invention, the attractive force element may be implemented as a third magnet 34 that has a magnetic pole surface having a different polarity from the upward magnetic pole surface 231 of the first magnet 23 and facing the teaching board 1.

According to an embodiment of the present invention, the second magnet 32 has a homopolar magnetic pole surface 322 having the same polarity as the upward magnetic pole surface 231 of the first magnet 23 and facing in a direction opposite to the attractive force element.

According to an embodiment of the present invention, the second magnet 32 is installed so that the homopolar magnetic pole surface 322 faces upward in an inclined direction.

According to an embodiment of the present invention, the second magnet 32 is configured as a plate-shaped magnet installed on the moving block 3 to form an angle with the upper surface of the teaching board 1.

According to an embodiment of the present invention, the dynamic three-dimensional teaching aid includes an attaching/detaching means 31 for attaching/detaching the teaching member 4 to/from the moving block 3.

According to an embodiment of the present invention, the attaching/detaching means 31 is provided on a side surface, in a direction in which a repulsive force acts by the second magnet 32, and a side surface, in a direction opposite to the direction in which the repulsive force acts by the second magnet 32, among side surfaces of the moving block 3.

According to an embodiment of the present invention, the control rod 2 is configured to have a plate shape with a handle 21 exposed to an outside of the teaching board 1 and a hole 221 formed by cutting out an inside of an edge to which the first magnet 23 is fixed. The control rod 2 is disposed between the teaching board 1 and an auxiliary board 11 connected to a point on the lower surface of the teaching board 1 via a connecting member 12, so that a moving range of the control rod 2 is limited by the connecting member 12 passing through the hole 221.

According to an embodiment of the present invention, at least one sheet 13, where teaching content is printed or the teaching member 4 is attached/detached, is provided on one side of the teaching board 1, and wherein the moving block 3 is placed on the sheet 13 covering the teaching board 1 and is moved by the control rod 2.

According to an embodiment of the present invention, the dynamic three-dimensional teaching aid further comprises a storage cabinet 14 provided under the teaching board 1 to store the moving block 3 and the teaching board 4.

According to an embodiment of the present invention, at least two of the teaching plate 1 having the control rod 2 disposed on the lower surface thereof are connected to each other side-by-side so that in an unfolded state, the moving block 3 is placed on each teaching board 1.

According to an embodiment of the present invention, a side of at least one sheet 13, where teaching content is printed or the teaching member 4 is attached/detached, is fixed to where the teaching boards 1 are connected to each other.

The present invention configured as described above allows for action of both attractive force and repulsive action by using a simplified method, which varies the installation form of magnets, unlike the conventional art that uses only either attractive force or repulsive force, in using magnets like in the conventional art. Thus, the present invention rotates the dynamic teaching tool 4 by a predetermined angle depending on the moving direction, thereby implementing such a dynamic character as if it moves vividly and naturally as real and thereby associating alphabet letters with figures, images, characters, or models in teaching. Further, it may be used for storytelling, and its manipulation method is simpler like that of the conventional art, and is easy to use.

DETAILED DESCRIPTION

Hereinafter, embodiments of the present invention are described in conjunction with various specific examples, in such a detailed manner as to allow one of ordinary skill in the art to easily practice, with reference to the accompanying drawings. However, since various changes or modifications may be made thereto, the present invention is not limited to the embodiments described below. Well-known components, functions, structures, methods, or typical details may be apparent to one of ordinary skill in the art, and thus, no detailed description thereof is made. When an element "includes" another element, the element may further include the other element, rather excluding the other element, unless particularly stated otherwise.

Figure 1:
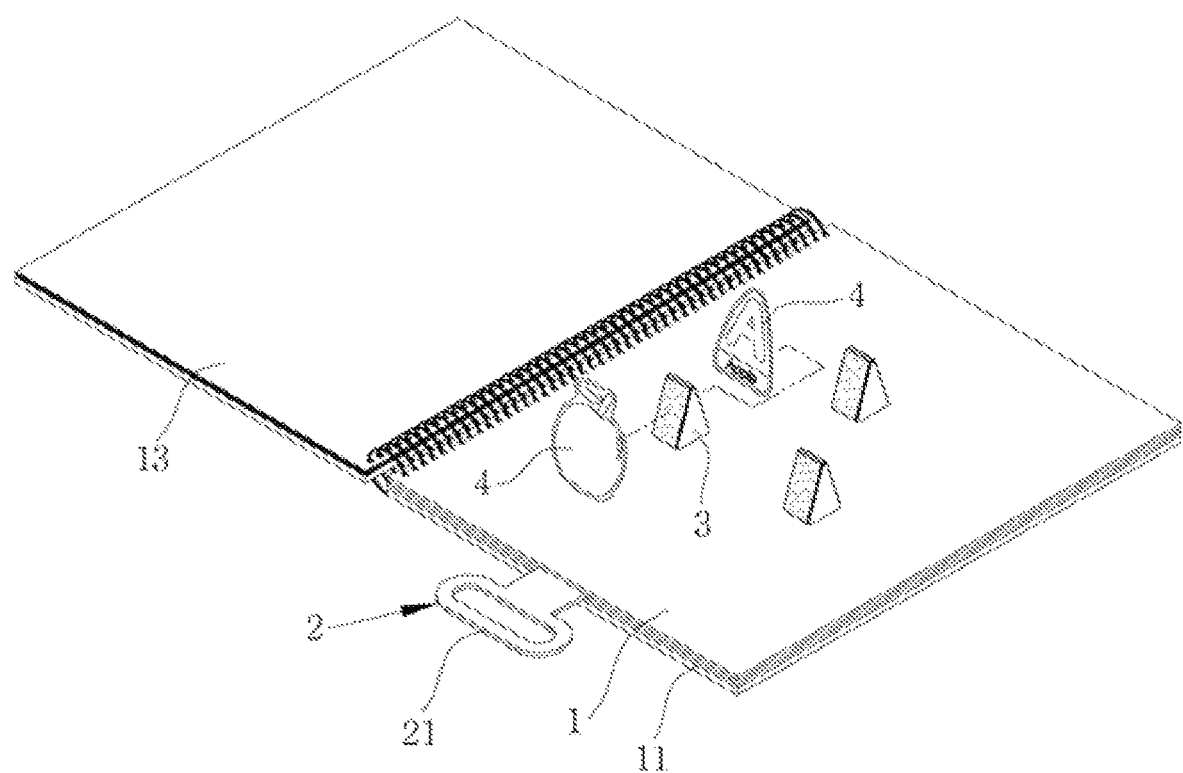
FIG. 1 is a perspective view illustrating a teaching preparation process of a dynamic three-dimensional teaching aid according to a first embodiment of the present invention.

FIG. 1 is a perspective view illustrating components of a dynamic three-dimensional teaching aid according to a first embodiment of the present invention and a teaching preparation process using the same.

Figure 2:
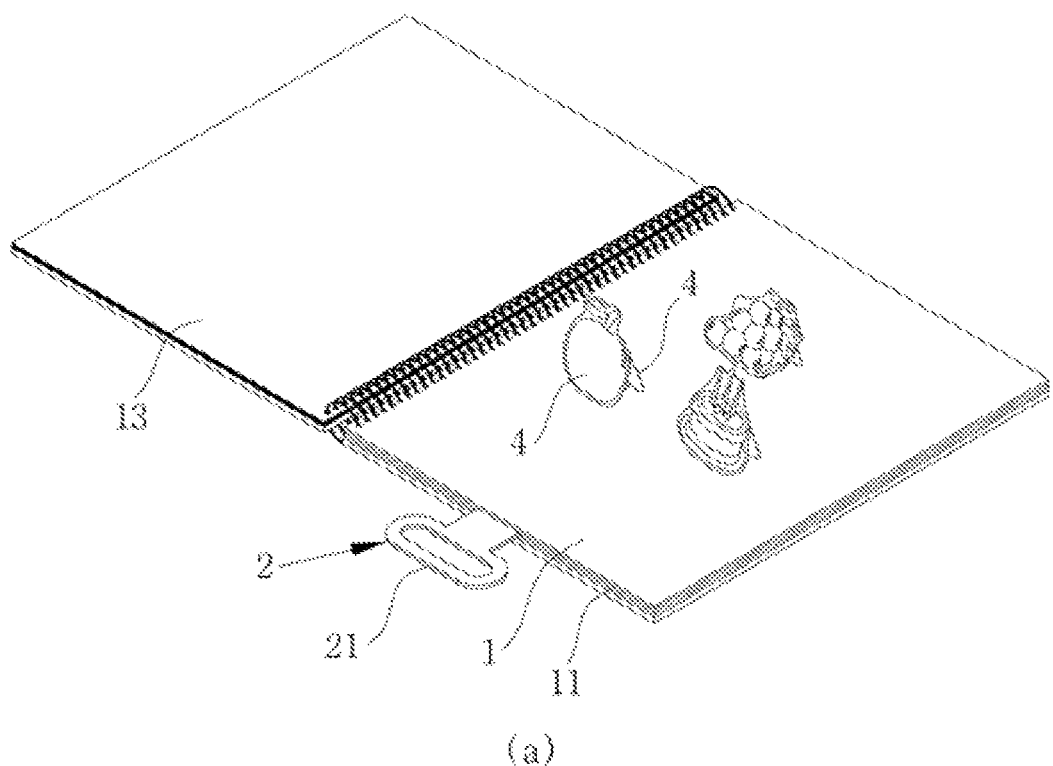
FIG. 2 is a use state view illustrating an example in which a moving block 3 is rotated while moving, as a control rod 2 is moved.
Figure 2:
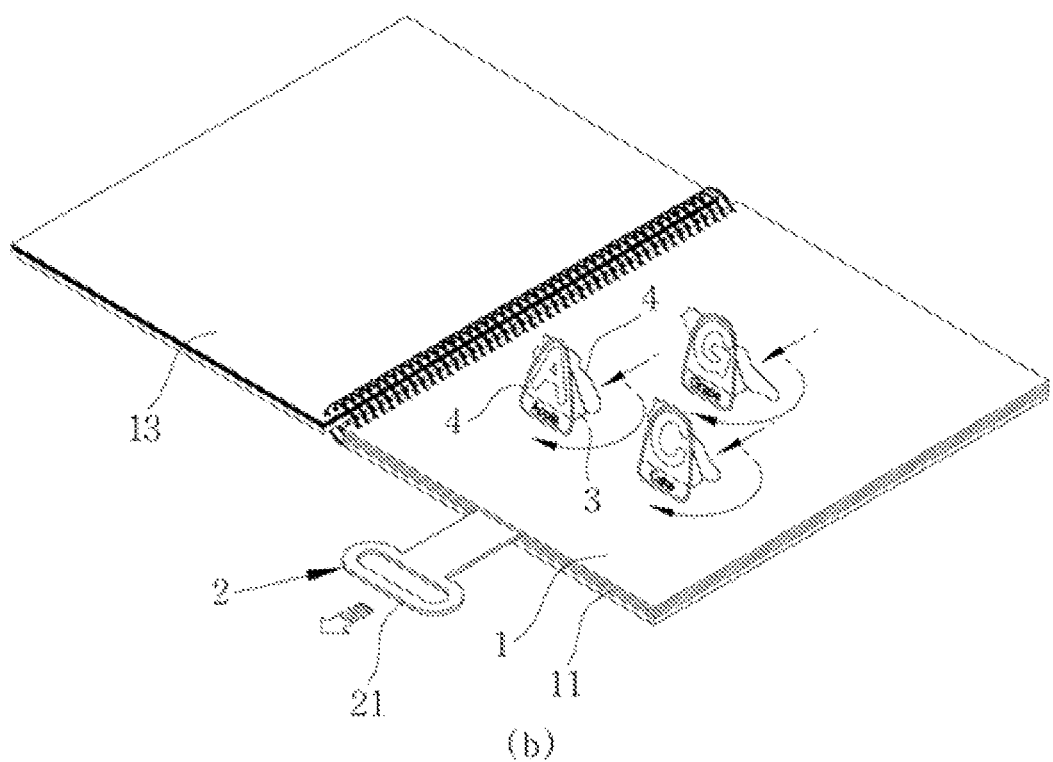
Figure 3:
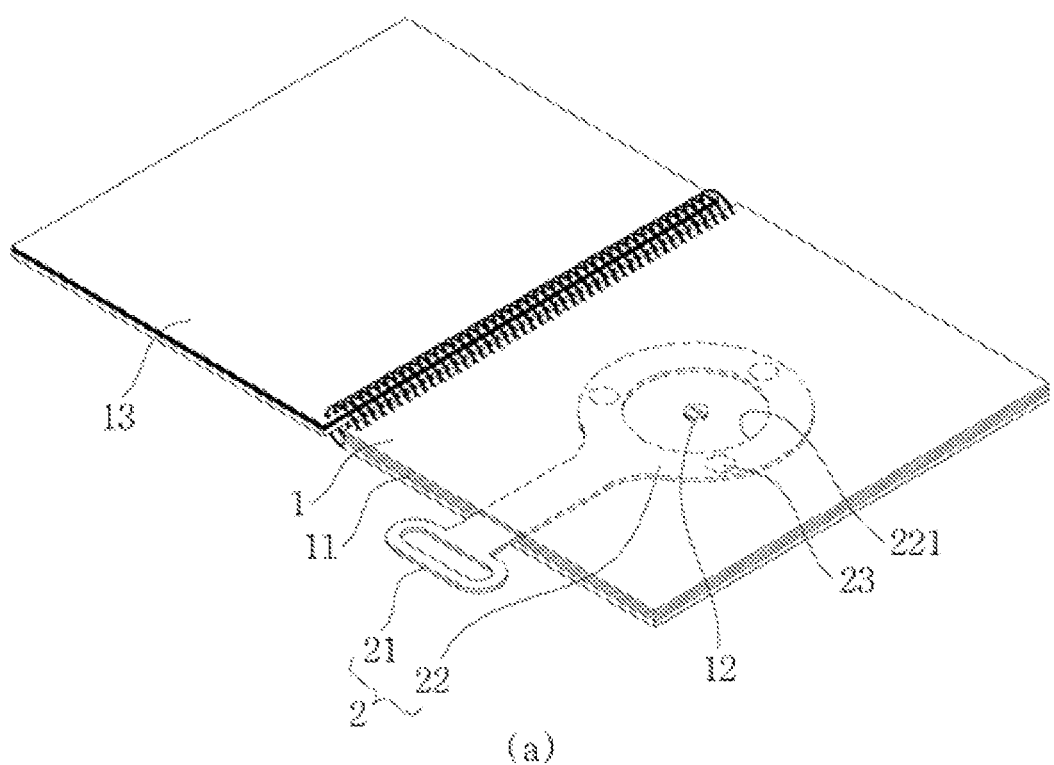
FIG. 3 illustrates a see-through view (a) and an exploded view (b) of a teaching board 1.
Figure 3:
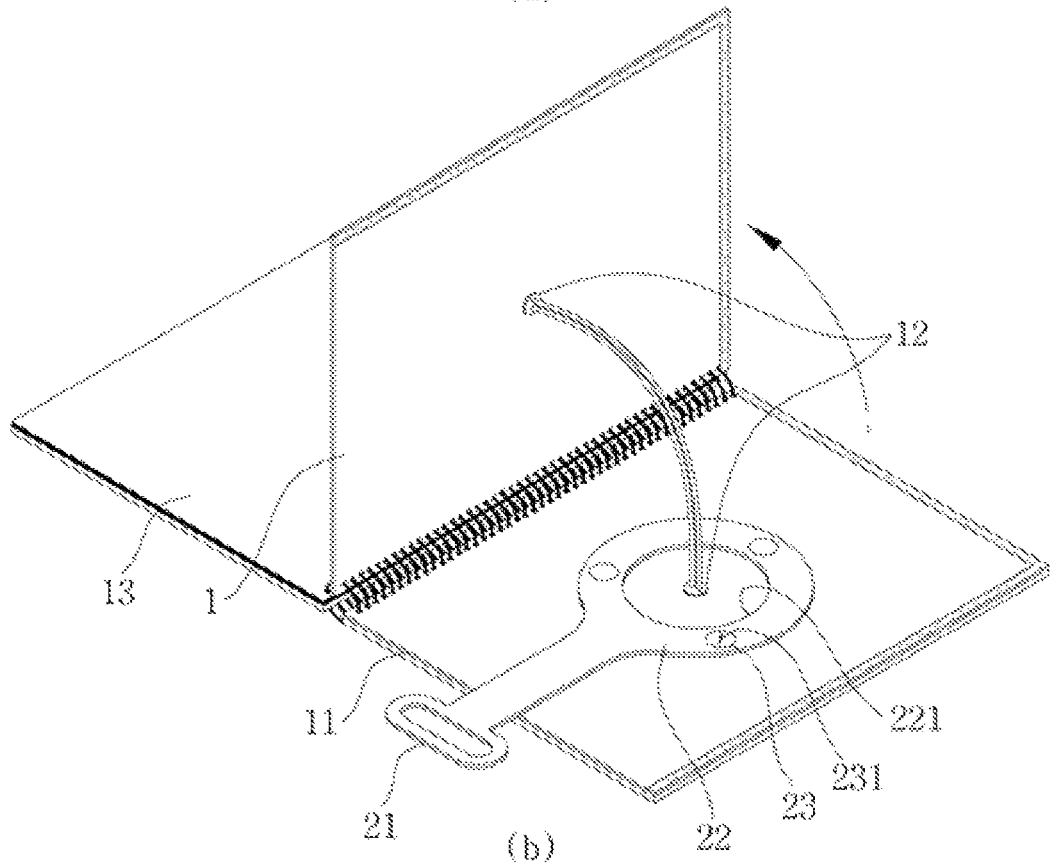

FIG. 2 is a use state view illustrating an example in which a moving block 3 is rotated while moving as a control rod 2 is manipulated after the teaching preparation of FIG. 1 is complete.

Figure 4:
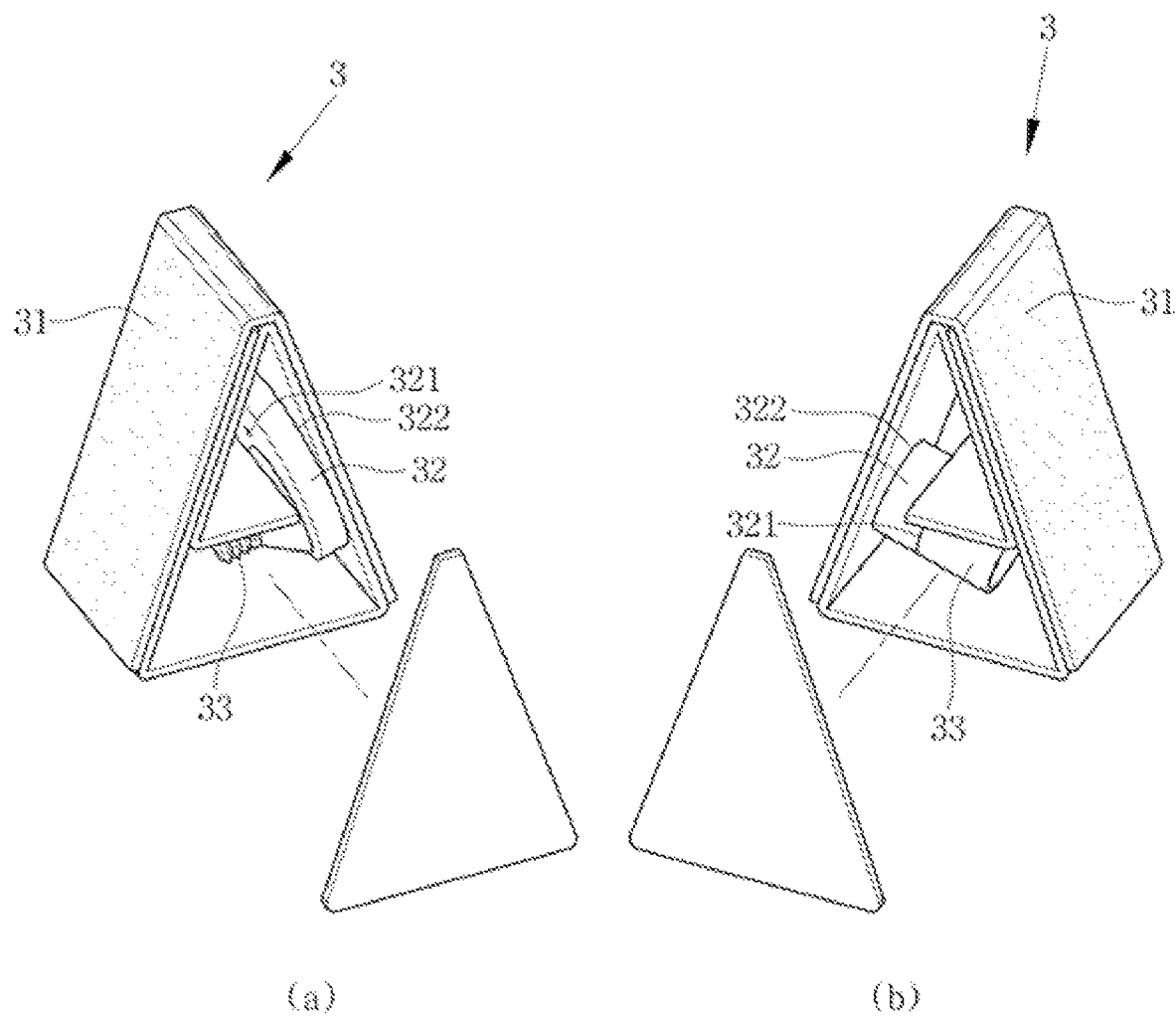
FIG. 4 is a view illustrating an inside of a moving block 3.

FIG. 4 illustrates a see-through view (a) and an exploded view (b) of a teaching board 1 to describe a control rod 2 coupled to a teaching board 1.

FIG. 4 is a view illustrating components received in a moving block 3 to rotate the moving block 3 on an upper surface of a teaching board 1 according to manipulation of the control rod 2.

Referring to FIGS. 1 to 4, according to a first embodiment of the present invention, a dynamic three-dimensional teaching aid includes a teaching board 1 provided with a sheet 13, a control rod 2 disposed on a lower surface of the teaching board 1, a moving block 3 placed on an upper surface of the teaching board 1, and a teaching member 4 coupled to the moving block 3.

The teaching board 1 has a plate shape configured so that the moving block 3 is placed on the upper surface thereof and controlled by the control rod 2. For example, the teaching board 1 may be formed of paper or a plate or board material. Although teaching content is not shown on the upper surface in the drawings, teaching content may be printed on the upper surface of the teaching board 1 or teaching members to show teaching content may be attached to/detached from the upper surface of the teaching board 1.

Since at least one sheet 13 is coupled to one side of the teaching board 1, although the sheet 13 covers the upper surface of the teaching board 1 and the moving block 3 is placed on the sheet 13, the moving block 3 may be moved by the control rod 2. Here, various teaching content may be printed on the sheet 13 or teaching members may be attached to/detached from the sheet 13.

The dynamic three-dimensional teaching aid of the present invention may be configured in the form of a book composed of sheets or in a form in which the control rod 2 is coupled to a single teaching board 1.

At least one first magnet 23 is disposed on the lower surface of the teaching board 1. The first magnet 23 has an upward magnetic pole surface 231 and a downward magnetic pole surface that have different polarities. In other words, the first magnet 23 having the magnetic pole surface with either N pole and S pole as the upward magnetic pole surface 231 may be left in contact with, or very close to, the lower surface of the teaching board 1, with the magnetic pole surface with the other polarity, as the downward magnetic pole surface, disposed to face downward. In other words, the magnetic force by the upward magnetic pole surface 231 acts toward the teaching board 1, and the magnetic force by the downward magnetic pole surface does not act to the teaching board 1.

The first magnet 23 may be moved along the lower surface of the teaching board 1 by the teacher and, to that end, the control rod 2 is used.

According to a specific embodiment, the control rod 2 is configured in the form of a plate that includes an overlapping portion 22 that overlaps the lower surface of the teaching board 1 and a handle 21 that is exposed to the outside of one side (the lower side in the shown embodiment) of the teaching board 1. The overlapping portion 22 has the first magnet 23 fixed on the edge thereof and has a hole 221 formed by cutting the inside of the edge. In the first magnet 23, a hole or recess may be formed in the edge of the overlapping portion 22, and the first magnet 23 may be fitted into the hole or recess not to protrude beyond the top of the overlapping portion 22.

An auxiliary board 11 is provided that is connected to one point on the lower surface of the teaching board 1 via a connecting member 12 to overlap the teaching board 1 while being spaced apart from the teaching board 1 as much as the connecting member 12, so that the control rod 2 is disposed between the teaching board 1 and the auxiliary board 11, with the connecting member 12 penetrated through the hole 221. Thus, the control rod 2 may be stopped by the connecting member 12 whatever directions it is moved, and thus, its moving range may be limited. Thus, the control rod 2 may be moved while remaining in contact with the teaching board 1 without escaping off the teaching board 1. In other words, if the control rod 2 is moved by gripping and moving the handle 21 of the control rod 2, the first magnet 23 installed on the overlapping portion 22 of the control rod 2 is moved while the upward magnetic pole surface 231 remains in contact to or close to the teaching board 1, and the strength of the magnetic force of the upward magnetic pole surface 231 acting to the upper surface of the teaching board 1 remains constant.

The teaching board 1, auxiliary board 11, and sheet 13 may be formed of a thin sheet of paper and in such case, a book cover (not shown) may be added.

Meanwhile, the connecting member 12 may be divided into a portion, attached to the lower surface of the teaching board 1 and connected with a string, and a portion attached to the upper surface of the auxiliary board 11 and allowing the string to pass therethrough and to be knotted on the lower surface of the auxiliary board 11, and by forming a fixing knot, the connecting member 12 may allow the teaching board 1 and the auxiliary board 11 to overlap each other with the control rod 2 interposed therebetween. However, the connecting member 12 is not limited to such structure and may have any structure that connects the teaching board 1 and the auxiliary board 11 with a gap left therebetween. For example, the connecting member 12 may be configured as a snap button.

Although the hole 221 is circular, and the connecting member 12 is formed to have a circular cross section with a diameter relatively much smaller than the hole 221, the present invention is not limited thereto, and they may be preferably configured to be able to secure as large a moving range of the first magnet 23 on the lower surface of the teaching board 1 as possible.

Although not described in detail, a spacer having the same thickness as the control rod 2 may be interposed between the teaching board 1 and the auxiliary board 11 and in the other directions than the direction in which the handle 21 is exposed. In other words, although the teaching board 1 and the auxiliary board 11 are formed of paper, it is preferable to prevent them from abrasion due to friction with the control rod 2. The spacer may be fixed to either the teaching board 1 or the auxiliary board 11 and stuck to the other.

The control rod 2 interposed between the teaching board 1 and the auxiliary board 11 may perform various motions allowed on a plane by moving the hand gripping the handle 21. Accordingly, the first magnet 23 installed on the control rod 2 may be linearly moved in whatever direction, e.g., on a plane, or moved in a curve or rotated in place. Of course, if a plurality of first magnets 23 are installed, the plurality of first magnets 23 may perform different motions. For example, one first magnet 23 may be rotated in place while another first magnet 23 may be moved in a circle.

Meanwhile, the teaching board 1, the auxiliary board 11, and the sheet 13 may be formed of paper and be configured in the form of a book with a book cover but, without limited to paper, they may be shaped as a flat board, and the whole or part may be formed of, e.g., a wood board or plastic board and configured in the form of a book.

The moving block 3 is placed on the upper surface of the teaching board 1. The moving block 3 has an attaching/detaching means 31 on an outer surface thereof to attach or detach the teaching member 4. The moving block 3 includes an attractive force element to exert an attractive force to be attracted to the upward magnetic pole surface 231 of the first magnet 23 and a second magnet 32 to exert a repulsive force to be moved away from the upward magnetic pole surface 231 of the first magnet 23.

The attractive force element allows an attractive force to act to the bottom surface in surface contact with the teaching board 1 in the moving block 3, allowing the moving block 3 to stabilize the upright position of the moving block 3. The second magnet 32 is disposed on a side of the attractive force element and applies a repulsive force in any one direction with respect to the attractive force element.

According to the specific embodiment shown in FIG. 4, the moving block 3 has an isosceles triangular shape in vertical cross-section and has portions inclined at the same angle so that, as described below, a doll-shape teaching member 4 may easily be fitted and fixed in the moving block 3.

The attaching/detaching means 31 is attached to the outer surfaces of both the inclined portions of the moving block 3. The second magnet 32 is attached to the inner surface of one of both the inclined portions, so that the magnetic pole surfaces 321 and 322 of the second magnet 32 form an acute angle with the bottom portion in surface contact with the upper surface of the teaching board 1.

Here, the second magnet 32 is configured as a plate-shape magnet so that a surface of the second magnet 32, facing the bottom portion downwardly in an inclined direction, is formed as a heteropolar magnetic pole surface 321 having the same polarity as the upward magnetic pole surface 231 of the first magnet 23, and a surface opposite to the heteropolar magnetic pole surface is formed as a homopolar magnetic pole surface 322 having the same polarity as the upward magnetic pole surface 231 of the first magnet 23. The homopolar magnetic pole surface 322 is attached to the inner surface of one inclined side portion of the moving block 3.

Further, the attractive force element may be configured as a metal piece 33 that is attached to a magnet. The attractive force element is attached to the heteropolar magnetic pole surface 321 of the second magnet 32 to be adjacent to the bottom surface of the moving block 3. Thus, the attractive force element is subjected to strong attractive force to allow it to stick to the first magnet 23, so that the moving block 3 is attracted by the first magnet 23 moved by the control rod 2 and is moved on the upper surface of the teaching board 1. In this case, since the metal piece 33 is attached by the magnetic force of the heteropolar magnetic pole surface 321, the metal piece 33 may have any material or shape, e.g., a bolt or short metal pipe exemplified in FIG. 4, which may be stuck to a magnet and may have any size in which the metal piece 33 may be received inside the moving block 3.

Since the homopolar magnetic pole surface 322 of the second magnet 32 faces in the direction opposite to the metal piece 33 and upwardly in an inclined direction, a relatively weak repulsive force, rather that the attractive force by the metal piece 33, acts to the upward magnetic pole surface 231 of the first magnet 23. Accordingly, when attracted and moved by the first magnet 23 which is moved by the control rod 2, the moving block 3 takes a position in which the portion where the second magnet 32 is installed faces rearward.

Resultantly, since the moving block 3 is moved with the surface, in the opposite direction to the second magnet 32-installed portion, being the front surface, the moving block 3 is rotated in a different rotation angle depending on the moving direction and, although the moving direction is changed, the moving block 3 maintains the position in which the front surface faces in the moving direction. This is described in detail with reference to FIG. 5.

Figure 5:
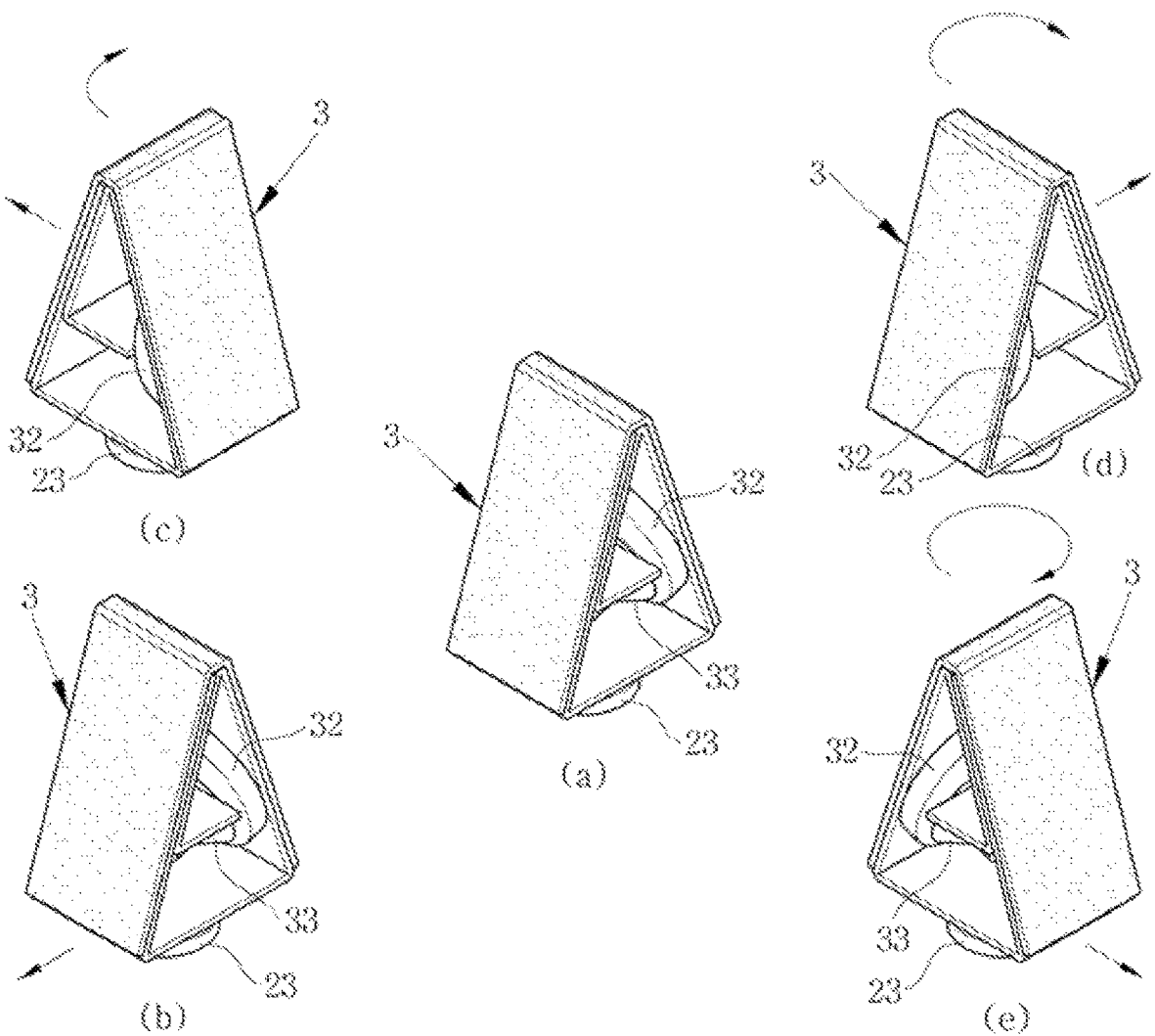
FIG. 5 is a view illustrating a direction of rotation of a moving block 3 according to a moving direction of the moving block 3 attracted by a first magnet 23 fixed to a control rod 2.

FIG. 5 is a view illustrating the direction of rotation of the moving block 3, attracted to the first magnet 23 fixed to the control rod 2, depending on the moving direction. FIG. 5 shows an example of the rotating direction of the moving block 3 that is varied depending on the moving direction when the moving block 3 is moved. In FIG. 5, the teaching board 1 and the control rod 2 are omitted to show in more detail the position of the moving block 3 attracted and moved by the first magnet 23.

In the moving block 3 of FIG. 5(a), the direction in which the second magnet 32-installed portion faces is determined depending on the position of the moving block 3 when the moving block 3 is placed on the teaching board 1 or the moving direction immediately before the moving block 3 that is moving is stopped.

As shown in FIG. 5(b), if the first magnet 23 is moved in the direction opposite to the second magnet 32, the repulsive force by the second magnet 32 acts in the direction opposite to the moving direction so that the moving block 3 is attracted and moved by the first magnet 23 but is not rotated.

In contrast, as shown in FIGS. 5(c), (d), and (e), if the first magnet 23 is moved in a different direction from the opposite direction to the second magnet 32, the moving block 3 is rotated by the angular difference between the moving direction at that time and the moving direction of FIG. 5(b). An example is described with clockwise angles. The moving block 3 may be rotated by 90 degrees as shown in FIG. 5(c), by 180 degrees as shown in FIG. 5(d), by 270 degrees as shown in FIG. 5(e). Such rotational angles vary depending on the moving direction.

The reason why the moving block 3 is rotated as such is that at the time when starting to be attracted and moved by the first magnet 23, the moving block 3 slightly lags behind due to friction between the moving block 3 and the teaching board 1, and the repulsive force applied to the first magnet 23 by the second magnet 32 increases, and thus, the second magnet 32 is forced to be pushed in the direction opposite to the moving direction while the moving block 3 is attracted by the attractive force by the metal piece 33.

Meanwhile, as a modification to the moving block 3, although the metal piece 33 is not installed in the moving block 3, the heteropolar magnetic pole surface 321 of the second magnet 32 may function as the attractive force element that exerts attractive force to the upward magnetic pole surface 231 of the first magnet 23. Since the heteropolar magnetic pole surface 321 faces obliquely downward the bottom surface of the moving block 3 abutting the teaching board 1, the heteropolar magnetic pole surface 321 exerts a relatively large attractive force than the repulsive force by the homopolar magnetic pole surface 322 of the second magnet 32 so that, although a repulsive force acts in one direction, the moving block 3 may be attracted to the first magnet 23.

However, since attractive force is relatively weakened if the metal piece 33 is not installed, a second magnet 32 with strong magnetic force needs to be used. If the angle between the heteropolar magnetic pole surface 321 and the bottom surface of the moving block 3 is rendered to reduce to increase attractive force, the repulsive force by the homopolar magnetic pole surface 322 is weakened. Thus, it is preferable to install the metal piece 33 to exert sufficient attractive force and repulsive force while using the second magnet 32 that has a weak magnetic force.

As another modification example, although the metal piece 33 may be fixed and installed on the internal bottom surface of the moving block 3, it may be difficult to securely fix the metal piece 33 due to attractive force by the heteropolar magnetic pole surface 321 of the second magnet 32. Thus, it is preferable to leave the metal piece 33 magnetically attached to the heteropolar magnetic pole surface 321 of the second magnet 32 rather than fixing the metal piece 33 to the internal bottom surface.

Further, if the metal piece 33 is installed, sufficient attractive force acts although the second magnet 32 is erected vertically or is installed so that an acute angle is formed between the homopolar magnetic pole surface 322 and the teaching board 1. Thus, the form of the moving block 3 may advantageously be configured to differ from examples shown in the drawings.

Figure 6:
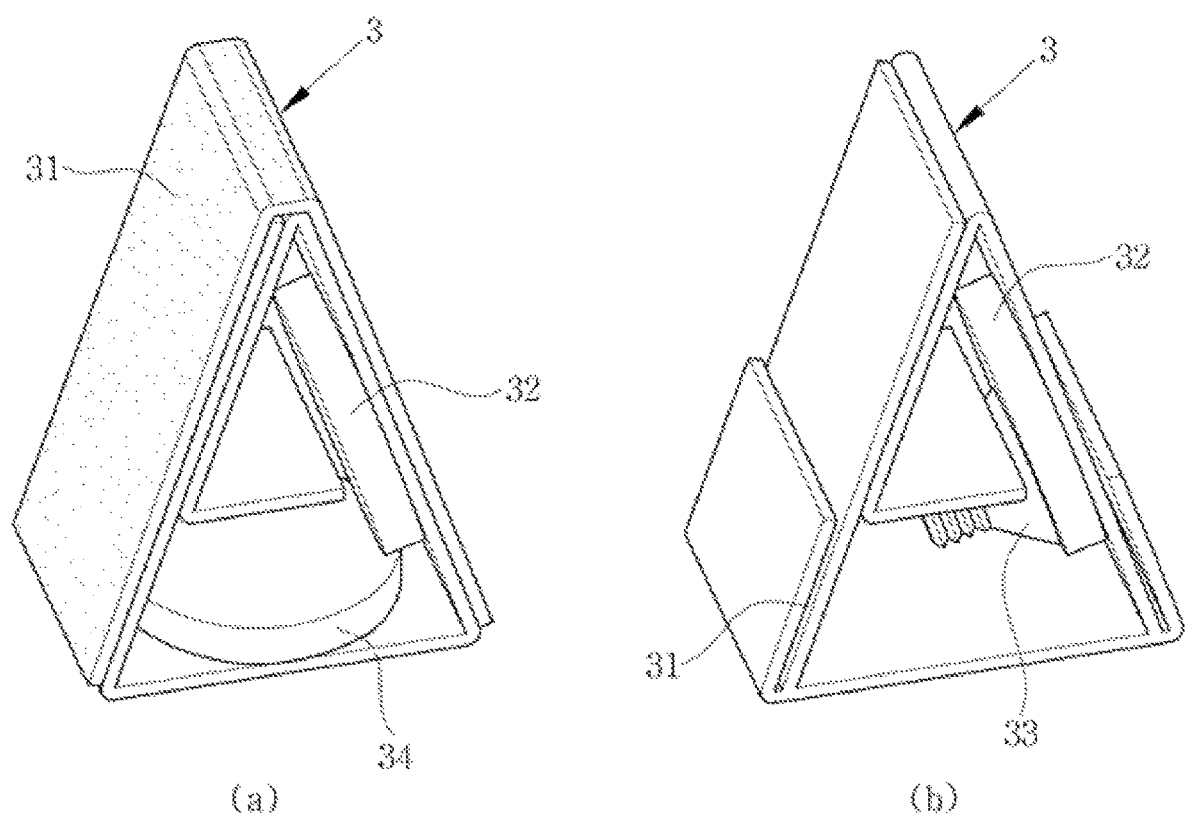
FIG. 6 is a view illustrating a modified embodiment of the moving block 3.

FIG. 6 is a view illustrating another modified embodiment of the moving block 3.

Referring to FIG. 6(a), instead of installing a metal piece 33 in the moving block 3, a third magnet 34 is installed on the internal bottom surface of the moving block 3. In this case, the third magnet 34 is installed so that a magnetic pole surface of the third magnet 34, having a different polarity from the upward magnetic pole surface 231 of the first magnet 23, faces the internal bottom surface. In other words, the attractive force element may be configured as the third magnet 34. In this case, strong attractive force acts to the upward magnetic pole surface 231 of the first magnet 23, but since attractive force is generated between the second magnet 32 and the third magnet 34, the third magnet 34 needs to be securely fixed and installed.

Referring to FIG. 6(b), the attaching/detaching means 31, installed on the outer surface of the moving block 3, is configured to allow the teaching member 4 to be attached and detached in a press-fitting manner, not a sticking manner. For example, the attaching/detaching means 31 is configured to add a plate-shaped component that is connected to the bottom surface and has a gap from the side surface. However, the attaching/detaching means 31 may have both a sticking-type component and a press-fitting type component or, as another example, may be configured to be installed on the teaching member 4 or, by changing the shape of the moving block 3, to be installed on the upper surface of the moving block 3.

The so-configured moving block 3, with the teaching member 4 attached thereto as shown in FIG. 1, may be placed on the teaching board 1 to be positioned on the first magnet 23 and be positioned to the state shown in FIG. 2(a), and then, be rotated while moving as shown in FIG. 2(b) by gripping the handle 21 and moving the control rod 2.

Referring to the use state views of FIGS. 1 and 2, teaching is conducted as follows. A teaching member 4, on which an image is printed, and another teaching member 4, on which an image and an alphabet letter and word are printed, are stuck to two attaching/detaching means 31, respectively, of the moving block 3, and the moving block 3 is placed on the teaching board 1, and while being moved in the state of FIG. 5(a), the moving block 3 is rotated to the state of FIG. 5(d). By alternately showing the image and alphabet letter and word by the dynamic movement of the moving block 3, it is possible to teach infants or children alphabet while arousing curiosity and interest.

Although FIG. 2 only shows a use state in which the moving block 3 is linearly moved by pulling the handle 21, the moving block 3 is not limited to linear movement in a specific direction. The first magnet 23 may be moved in various manners, such as linear movement, curving, or rotating, depending on the movement of the hand gripping the handle 21, and thus, the moving block 3 attracted by the first magnet 23 may also be moved in various manners, such as linear movement, curving, or rotating. Whatever direction the moving block 3 is moved in, the moving block 3 maintains the position in which the portion opposite to the second magnet 32-installed portion takes the front surface. Accordingly, if the first magnet 23 is moved in a tiny circle, the moving block 3 may appear as if it is rotated substantially in place.

The teacher may diversify alphabet teaching and storytelling methods using the teaching members 4 by coupling the teaching member 4 to the moving block 3 which may be moved in various manners.

Meanwhile, as described in connection with FIG. 5, since the moving block 3 is attracted and rotated by the first magnet 23, with the second magnet 32-installed portion facing rearward, it is preferable to engrave a mark on the outer surface of the second magnet 32-installed portion or the outer surface of the portion opposite to the second magnet 32-installed portion to attach the teaching member 4 suitable for the teaching content to be displayed by rotation while moving.

Figure 7:
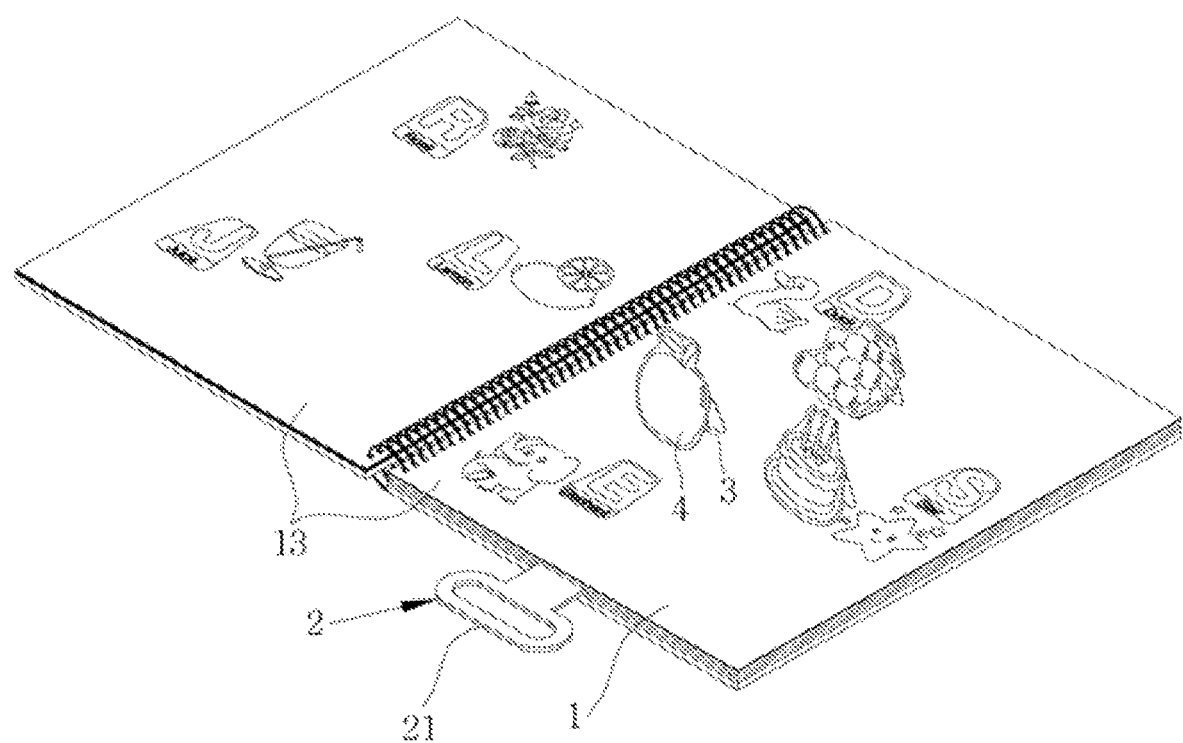
FIG. 7 is a use state view for teaching.
Figure 8:
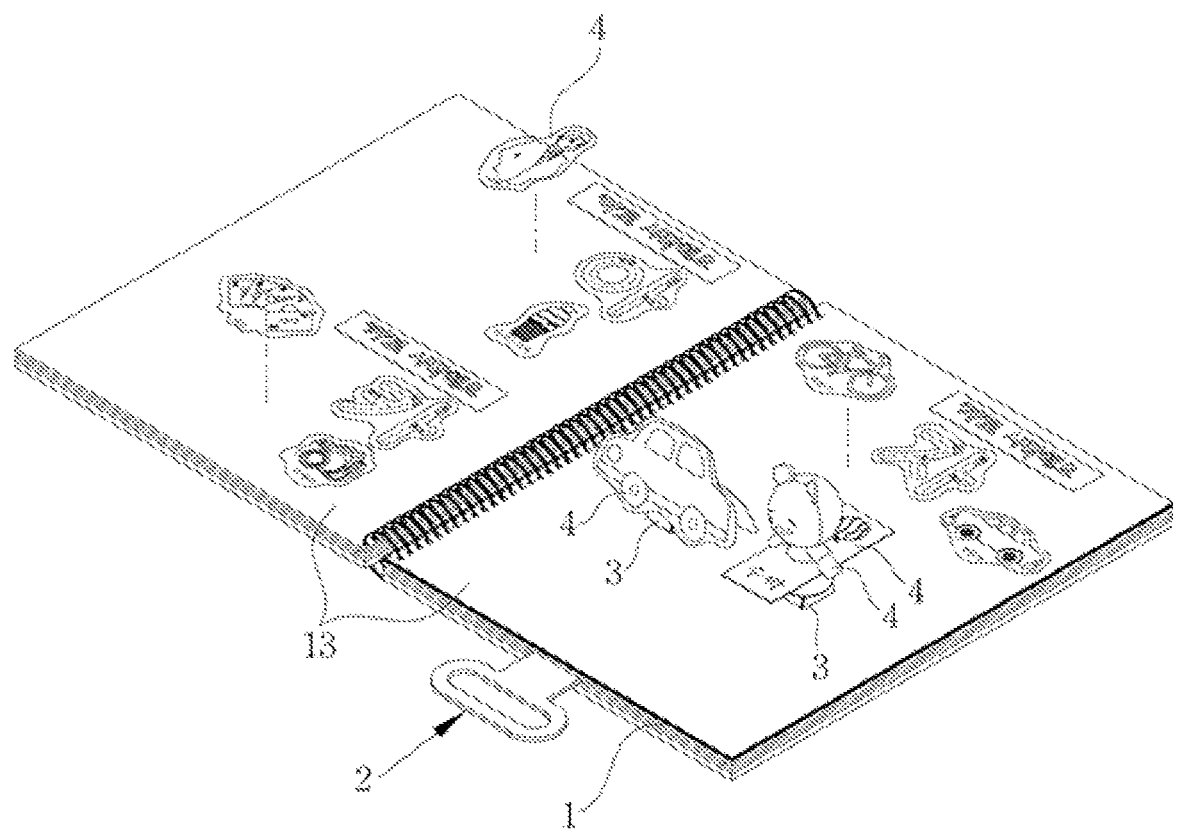
FIG. 8 is a use state view according to different teaching content.
Figure 9:
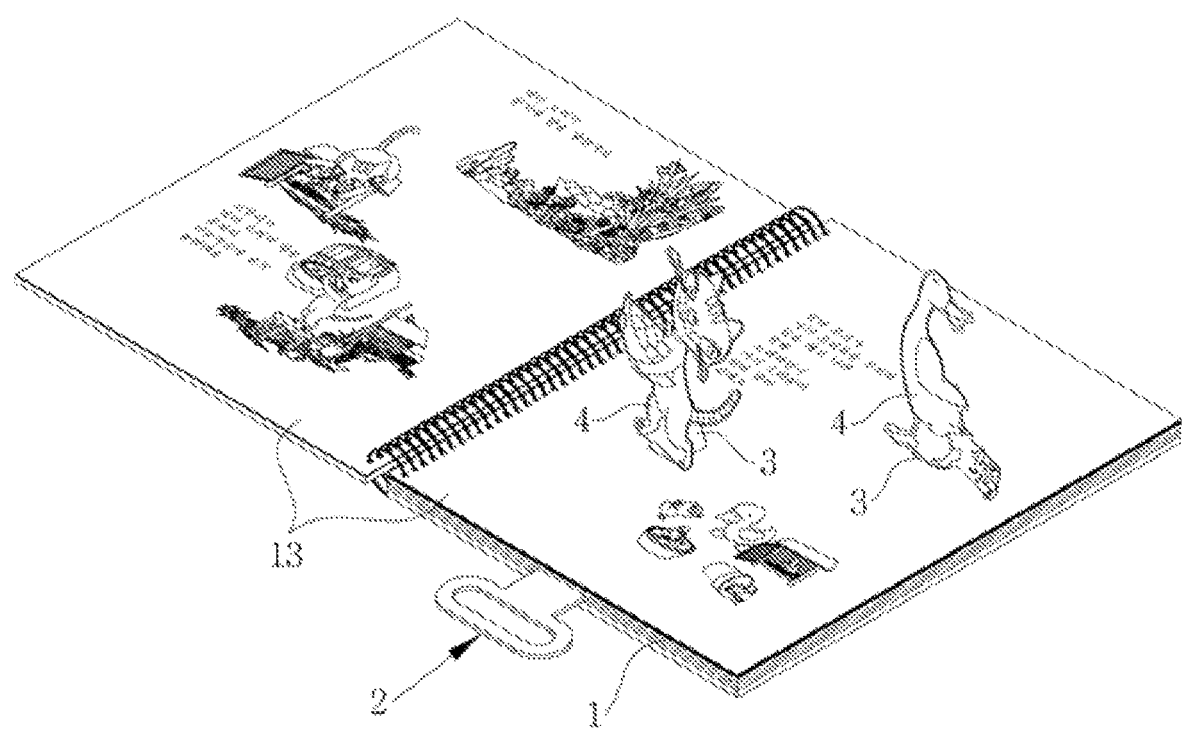
FIG. 9 is a use state view for storytelling.

FIGS. 7 to 9 are use state views illustrating covering the teaching board 1 with various teaching content-printed sheets 13, one by one, in teaching. By way of example, described is an embodiment in which teaching is conducted by sequentially turning a sheet on which English alphabet teaching content is printed, a sheet on which Korean alphabet teaching content is printed, and a sheet on which storytelling content is printed.

FIG. 7 illustrates a state in which the teaching board 1 is covered with the sheet 13 on which English letters, words, and related images are printed, and moving blocks 3 coupled with teaching members 4 as shown in FIGS. 1 and 2 are placed on the sheet 13 covering the teaching board 1. It is possible to conduct teaching while dynamically moving the English teaching content of the teaching members 4 coupled to the moving blocks 3 by moving and rotating the moving blocks 3 by manipulating the control rod 2, along with the stationary English teaching content printed on the sheet 13.

FIG. 8 illustrates a state in which the English teaching content-printed sheet 13 is covered with the sheet 13 on which Korean alphabet teaching content is printed, and moving blocks 3 coupled with Korean alphabet teaching content-printed teaching members 4 are placed on the sheet 13. As shown, the teaching members 4 may be formed as stickers and stuck to the moving blocks 3 on the sheet 13.

Further, as shown, the teaching members 4 coupled to the moving blocks 3 may include a doll-shaped teaching member 4 whose lower portion fitted over a moving block 3 and a plate-shaped teaching member 4 hung on the neck of the doll-shaped teaching member 4 in the middle between an image-printed portion and a Korean word-printed portion. Accordingly, as the teaching member 4 is moved by the control rod 2, the doll-shaped teaching member 4 may create such an appearance as if the doll moves while facing forward and may also create such an appearance as if the doll rotates to alternately show the image and the Korean word.

FIG. 9 illustrates a state in which the Korean alphabet teaching content-printed sheet 13 is covered with a storytelling content-printed sheet 13, and a moving block 3 coupled with a teaching member 4 printed with a character image appearing in the fairy tale is placed on the sheet 13. Thus, it is possible to conduct storytelling to create the scene of the fairy tale by moving the character by manipulating the control rod 2 to move the moving block 3.

Meanwhile, the moving block 3 shown in FIGS. 1 to 9 has the attaching/detaching means 31 on each of the side surface in the direction in which repulsive force is exerted by the second magnet 32 and the side surface in the direction opposite to the direction in which the repulsive force acts and is thus optimized to be rotated by 180 degrees and show. However, it is also possible to vary the teaching member 4 that may be to be shown per rotation angle adjustable by the control rod 2 by the attaching/detaching means 31 on each side surface of the moving block 3.

FIGS. 10 to 13 are views illustrating various modified embodiments for a dynamic three-dimensional teaching aid according to the present invention. Only modified configuration is described in detail.

Figure 10:
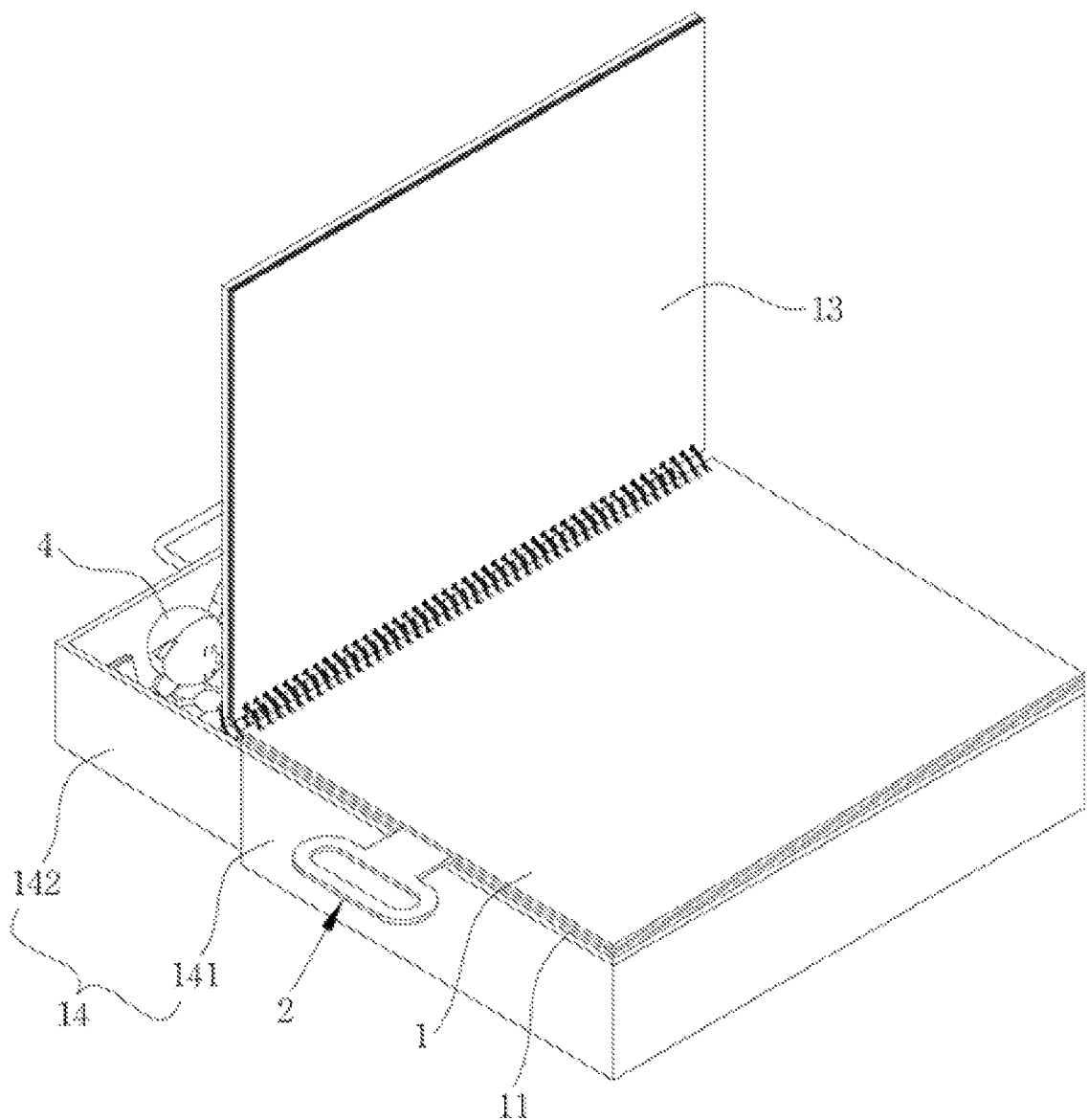
FIG. 10 is a perspective view illustrating a dynamic three-dimensional teaching aid according to a second embodiment of the present invention, in which a storage cabinet 14 may be provided.

FIG. 10 is a perspective view illustrating a dynamic three-dimensional teaching aid according to a second embodiment of the present invention, in which a storage cabinet 14 may be provided.

Referring to FIG. 10, a storage cabinet 14 is installed on the lower surface of the auxiliary board 11 connected to the teaching board 1, to store teaching members 4 and moving blocks 3.

In the embodiment of the present invention shown in the drawings, since the dynamic three-dimensional teaching aid is configured in the form of a book with a book cover, the storage cabinet 14 may include a drawer case 141 having an upper surface fixed to the book cover supporting the auxiliary board 11 and having a side opening and a drawer 142 installed in an inner space of the drawer case 141 to be drawn in or out through the side opening of the drawer case 141. Accordingly, various teaching members 4 and multiple moving blocks 3, to be used for teaching, may be stored in the drawer 142. Thus, it is possible to keep them organized, provide convenience in transporting and using, and prevent loss of the teaching members 4.

Figure 11:
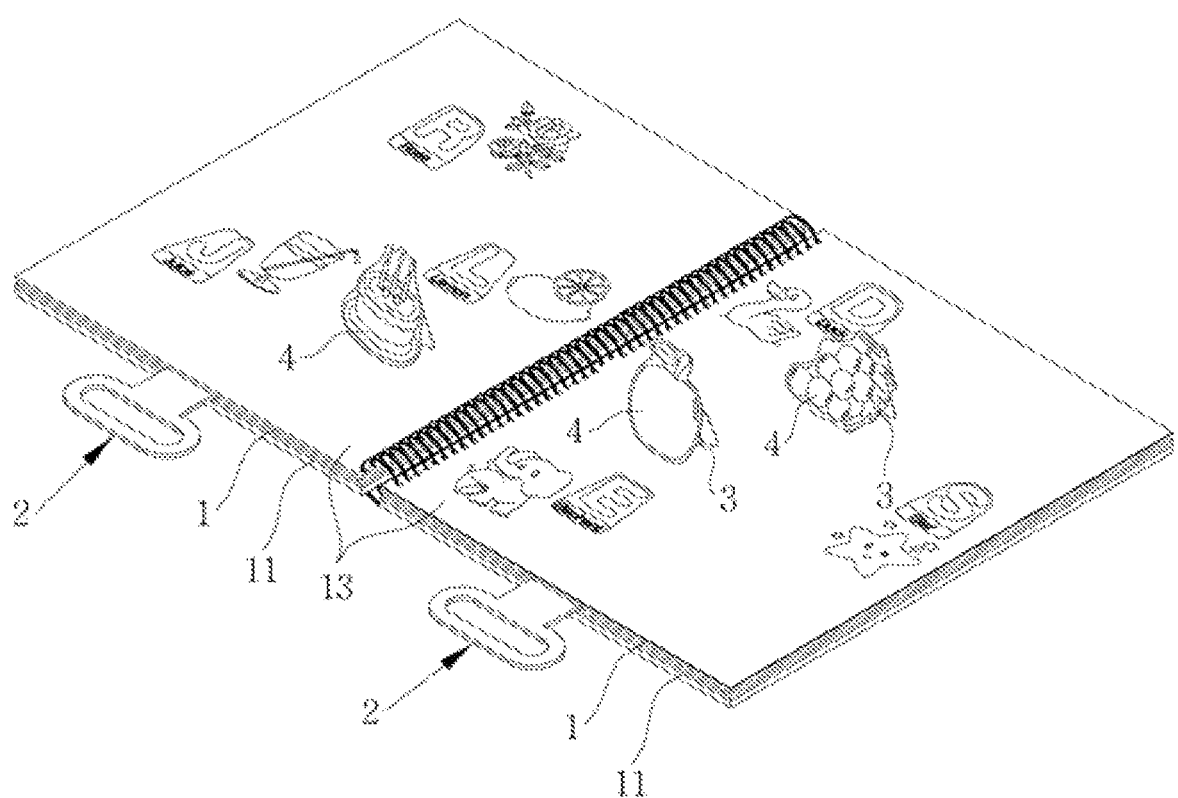
FIG. 11 is a perspective view illustrating a dynamic three-dimensional teaching aid according to a third embodiment of the present invention, in which two teaching boards 1 may be provided.

FIG. 11 is a perspective view illustrating a dynamic three-dimensional teaching aid according to a third embodiment of the present invention, in which two teaching boards 1 may be provided.

In the dynamic three-dimensional teaching aid of FIG. 11, there are provided two teaching boards 1, each of which is coupled with an auxiliary board 11 and a control rod 2 and is installed on a book cover, with sheets 13 provided therebetween in the form of a book.

Accordingly, it is possible to create dynamic movements by placing moving blocks 3 coupled with teaching members 4 on the sheets 13 exposed on the two teaching boards 1 and manipulating the two control rods 2. Thus, it is possible to conduct teaching while arousing interest and drawing attention from infants or children by both the sheets.

Figure 12:
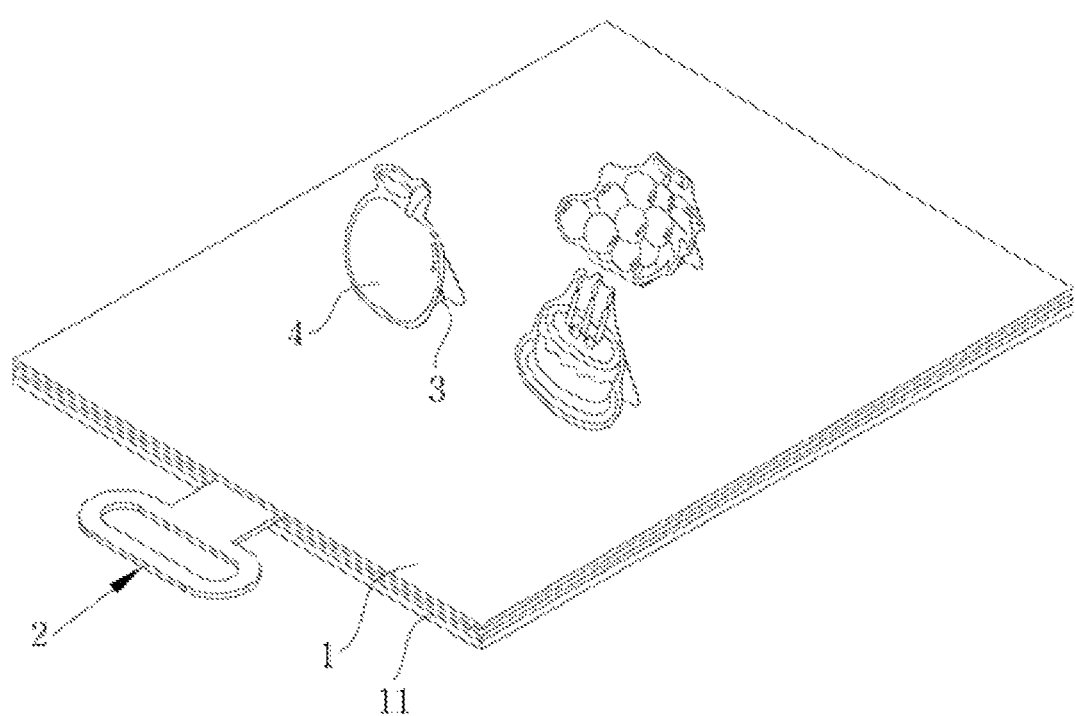
FIG. 12 is a view illustrating a dynamic three-dimensional teaching aid according to a fourth embodiment, in which no sheet 13 may be configured.

FIG. 12 is a view illustrating a dynamic three-dimensional teaching aid according to a fourth embodiment, in which no sheet 13 may be configured.

The dynamic three-dimensional teaching aid of FIG. 12 has a plate shape without a sheet 13, in which a teaching board 1, a control rod 2, and an auxiliary board 11 are combined together. Thus, attention is drawn only to the teaching board 1, so that teaching may be conducted, focusing only on the teaching members 4 coupled to the moving blocks 3 which are placed and moved on the upper surface of the teaching board 1. In this case, it is possible to conduct teaching on various contents by way of teaching members 4 that are directly attached/detached to/from the upper surface of the teaching board 1 as is a sticker.

Figure 13:
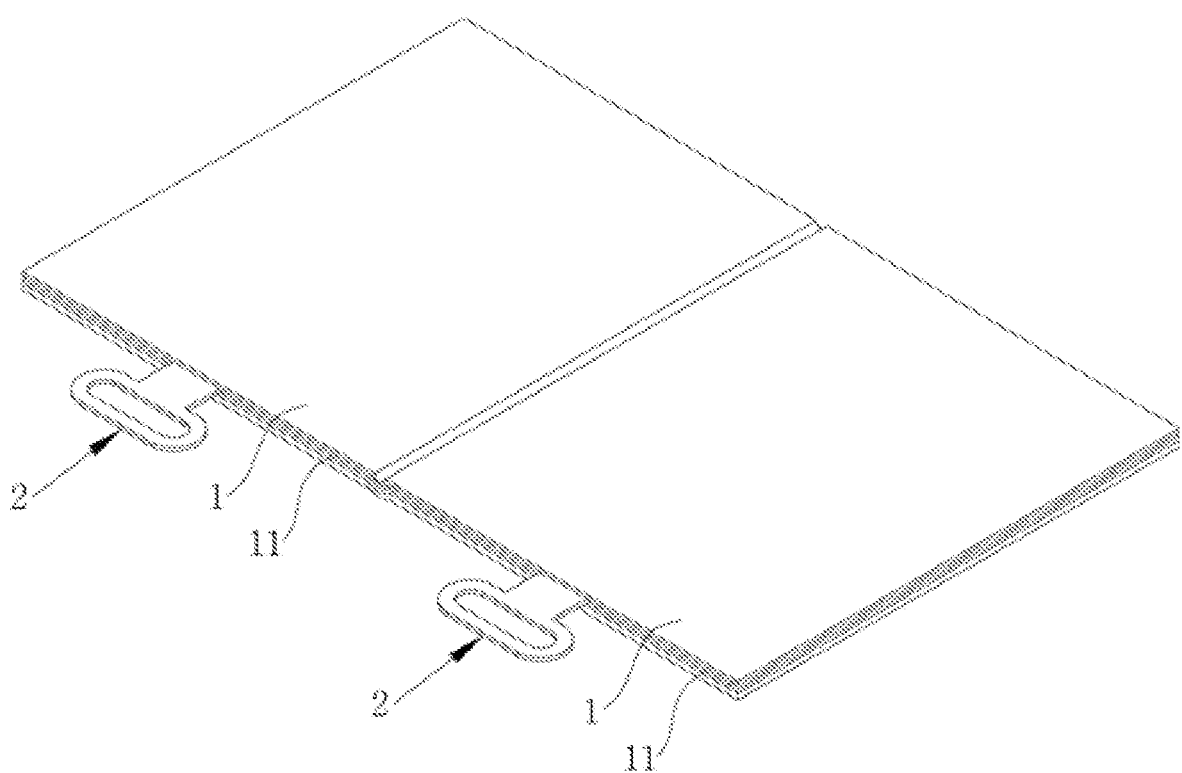
FIG. 13 is a view illustrating a dynamic three-dimensional teaching aid according to a fifth embodiment of the present invention, in which two teaching boards 1 with no sheet 13 may be provided.

FIG. 13 is a view illustrating a dynamic three-dimensional teaching aid according to a fifth embodiment of the present invention, in which two teaching boards 1 with no sheet 13 may be provided.

In the dynamic three-dimensional teaching aid of FIG. 13, two teaching boards 1, each of which is coupled with a control rod 2 and an auxiliary board 11, are connected to each other side by side to be folded. In the unfolded state of the two teaching boards 1, moving blocks 3 coupled with teaching members 4 may be placed and moved on each teaching board 1 during teaching.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims. Therefore, such modifications should be regarded as belonging to the scope of the present invention, and the scope of the present invention should be determined by the claims to be described later.

What is claimed is:

1. A dynamic three-dimensional teaching aid, comprising:
    a teaching board (1);
    a control rod (2) for moving at least one first magnet (23) along a lower surface of the teaching board (1), the at least one first magnet (23) including an upward magnetic pole surface (231) and a downward magnetic pole surface having different polarities;
    a moving block (3) placed on the teaching board (1) and including an attractive force element to apply an attractive force to the upward magnetic pole surface (231) of the first magnet (23) and a second magnet (32) to apply a repulsive force to the upward magnetic pole surface (231) to be able to rotate so that a repulsive force acts in a direction opposite to the moving direction of the first magnet (23); and
    a teaching member (4) coupled to the moving block (3), wherein
    the second magnet (32) is configured as a plate-shaped magnet that forms an angle with an upper surface of the teaching board (1) and that has a homopolar magnetic pole surface (322) having the same polarity as the upward magnetic pole surface (231) of the first magnet (23) and facing in a direction opposite to the attractive force element.

2. The dynamic three-dimensional teaching aid of claim 1, wherein
    the attractive force element is implemented as a metal piece (33) attached to a magnet.

3. The dynamic three-dimensional teaching aid of claim 2, wherein
    the metal piece (33) is attached to a heteropolar magnetic pole surface (321) of the second magnet (32), which has a different polarity from the upward magnetic pole surface (231) of the first magnet (23).

4. The dynamic three-dimensional teaching aid of claim 1, wherein
    the attractive force element is implemented by a heteropolar magnetic pole surface (321) of the second magnet (32), which has a different polarity from the upward magnetic pole surface (231) of the first magnet (23).

5. The dynamic three-dimensional teaching aid of claim 1, wherein
the attractive force element is implemented as a third magnet (34) that has a magnetic pole surface having a different polarity from the upward magnetic pole surface (231) of the first magnet (23) and facing the teaching board (1).

6. The dynamic three-dimensional teaching aid of claim 1, wherein
the second magnet (32) is installed so that the homopolar magnetic pole surface (322) faces upward in an inclined direction.

7. The dynamic three-dimensional teaching aid of claim 1, further comprising:
an attaching/detaching means (31) for attaching/detaching the teaching member (4) to/from the moving block (3).

8. The dynamic three-dimensional teaching aid of claim 7, wherein
the attaching/detaching means (31) is provided on a side surface, in a direction in which a repulsive force acts by the second magnet (32), and a side surface, in a direction opposite to the direction in which the repulsive force acts by the second magnet (32), among side surfaces of the moving block (3).

9. The dynamic three-dimensional teaching aid of claim 1, wherein
the control rod (2) is configured to have a plate shape with a handle (21) exposed to an outside of the teaching board (1) and a hole (221) formed by cutting out an inside of an edge to which the first magnet (23) is fixed, and wherein the control rod (2) is disposed between the teaching board (1) and an auxiliary board (11) connected to a point on the lower surface of the teaching board (1) via a connecting member (12), so that a moving range of the control rod (2) is limited by the connecting member (12) passing through the hole (221).

10. The dynamic three-dimensional teaching aid of claim 1, wherein
at least one sheet (13), where teaching content is printed or the teaching member (4) is attached/detached, is provided on one side of the teaching board (1), and wherein the moving block (3) is placed on the sheet (13) covering the teaching board (1) and is moved by the control rod (2).

11. The dynamic three-dimensional teaching aid of claim 1, further comprising:
a storage cabinet (14) provided under the teaching board (1) to store the moving block (3) and the teaching board (4).

12. The dynamic three-dimensional teaching aid of claim 1, wherein
at least two of the teaching plate (1) having the control rod (2) disposed on the lower surface thereof are connected to each other side-by-side so that in an unfolded state, the moving block (3) is placed on each teaching board (1).

13. The dynamic three-dimensional teaching aid of claim 12, wherein
a side of at least one sheet (13), where teaching content is printed or the teaching member (4) is attached/detached, is fixed to where the teaching boards (1) are connected to each other.

\* \* \* \* \*